United States Patent
Cui et al.

(10) Patent No.: US 10,538,326 B1
(45) Date of Patent: Jan. 21, 2020

(54) FLARE DETECTION AND AVOIDANCE IN STEREO VISION SYSTEMS

(71) Applicant: Amazon Technologies, Inc., Seattle, WA (US)

(72) Inventors: Chengwu Cui, Redmond, WA (US); Barry James O'Brien, Seattle, WA (US); Joshua John Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 15/253,339

(22) Filed: Aug. 31, 2016

(51) Int. Cl.
| | | |
|---|---|---|
| *B64C 39/02* | (2006.01) | |
| *B64D 47/08* | (2006.01) | |
| *H04N 5/357* | (2011.01) | |
| *G05D 1/00* | (2006.01) | |

(52) U.S. Cl.
CPC .......... *B64C 39/024* (2013.01); *B64D 47/08* (2013.01); *G05D 1/00* (2013.01); *H04N 5/3572* (2013.01); *B64C 2201/141* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,908,062 B2 * | 12/2014 | Ito | ........................ | H04N 5/3572 348/223.1 |
| 9,495,764 B1 * | 11/2016 | Boardman | ......... | G06K 9/00201 |
| 9,643,722 B1 * | 5/2017 | Myslinski | ............. | B64C 39/024 |
| 10,017,249 B1 * | 7/2018 | Tseng | .................... | B64C 39/024 |
| 10,194,135 B2 * | 1/2019 | Ge | ........................ | H04N 13/204 |
| 2010/0266273 A1 | 10/2010 | Wood | .................... | G03B 11/00 396/544 |
| 2011/0310231 A1 * | 12/2011 | Yamaguchi | ............ | G03B 17/14 348/49 |
| 2012/0075432 A1 * | 3/2012 | Bilbrey | ..................... | G01J 4/00 348/48 |
| 2015/0049915 A1 * | 2/2015 | Ciurea | ................. | H04N 13/232 382/106 |
| 2015/0229815 A1 * | 8/2015 | Nonaka | ................ | H04N 5/2258 348/218.1 |
| 2015/0339826 A1 * | 11/2015 | Buibas | ................... | B64D 47/08 901/1 |
| 2016/0070264 A1 * | 3/2016 | Hu | ........................ | G08G 5/0069 701/2 |
| 2016/0267720 A1 * | 9/2016 | Mandella | .............. | G06T 19/006 |
| 2017/0078552 A1 * | 3/2017 | Pochon | ................ | H04N 5/2351 |
| 2017/0094258 A1 * | 3/2017 | Cooper | .................... | H04N 9/09 |

(Continued)

*Primary Examiner* — Tyler W. Sullivan
(74) *Attorney, Agent, or Firm* — Lee & Hayes, P.C.

(57) ABSTRACT

This disclosure is directed to monitoring exposure levels for individual cameras of a stereo camera system to reduce unwanted lens flaring which may disrupt stereo vision capabilities of an unmanned aerial vehicle (UAV). The UAV may identify lens flaring by monitoring histogram data received from the cameras and then mitigate the lens flaring by performing aerial maneuvers with respect to the light source and/or moving camera componentry such as deploying a lens hood. The UAV may also identify lens flaring patterns that on a camera's sensor and determine a location of a peripheral light source based on these patterns. The UAV may then deploy a visor between the location of the peripheral light source and the cameras.

20 Claims, 8 Drawing Sheets

(56) References Cited

U.S. PATENT DOCUMENTS

| | | | |
|---|---|---|---|
| 2017/0236291 A1* | 8/2017 | Balley | H04N 7/185 |
| | | | 348/144 |
| 2017/0261318 A1* | 9/2017 | Takagi | G01C 3/085 |
| 2017/0261999 A1* | 9/2017 | Van Voorst | G08G 5/0069 |
| 2017/0336806 A1* | 11/2017 | Blanc-Paques | G08G 5/045 |
| 2017/0359534 A1* | 12/2017 | Li | H04N 5/2258 |
| 2017/0374277 A1* | 12/2017 | Dobashi | B64C 39/024 |
| 2018/0046187 A1* | 2/2018 | Martirosyan | G05D 1/0094 |
| 2018/0074519 A1* | 3/2018 | Qin | B64C 39/024 |
| 2018/0101173 A1* | 4/2018 | Banerjee | G06T 7/70 |
| 2019/0004512 A1* | 1/2019 | Liu | H04N 5/247 |
| 2019/0011921 A1* | 1/2019 | Wang | G05D 1/12 |

* cited by examiner

Cross-Section A-A

FLARE DETECTION AND AVOIDANCE IN STEREO VISION SYSTEMS

BACKGROUND

Some unmanned aerial vehicles (UAVs) are capable of travelling between destinations with little or no input from a human user. Although general route information may be determined in advance of a flight, an UAV may also need to dynamically sense and avoid obstacles such as buildings, trees, or even other vehicles while in route to a destination. Some UAVs utilize stereo vision systems to sense and avoid obstacles by comparing two or more images of the obstacles to calculate relative location and/or depth information associated with an obstacle. In particular, these systems can sense and locate an obstacle by first determining a disparity between two images containing the obstacle and then performing geometrical calculations using this determined disparity in conjunction with known camera geometry. The ability of a stereo camera system to generate quality imagery of obstacles correlates with the system's ability to determine the disparity and, therefore, to sense and avoid obstacles.

Peripheral light sources may cause lens flare to occur in the cameras of a stereo camera system and this may hinder the system's ability to generate quality imagery. For example, lens flare may overexpose portions of images rendering it impossible to sense objects which would have otherwise been captured within those overexposed portions. The problem of lens flare is exacerbated by movement of UAVs which may quickly and unexpectedly alter the position of peripheral light sources with respect to a stereo camera system mounted to the UAV. This is because depending on the specific configuration of a camera's lens system, even small deviations in a camera's orientation with respect to a light source may dramatically increase the occurrence of stray light passing through the lens system and reaching a camera sensor.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

This disclosure provides systems, apparatuses, and methods for identifying overexposure of images captured by an unmanned aerial vehicles (UAVs) stereo camera system, e.g. overexposure caused by lens flare, and automatically adjusting camera componentry to mitigate the overexposure thereby resuming the stereo camera system's ability to sense and avoid obstacles. Based on an exposure level increasing beyond an exposure threshold (e.g. a level beyond where the stereo camera system remains function), the UAV may perform a sequence of maneuvers until the exposure level is decreased such as offsetting a heading of the UAV with respect to a course of the UAV to turn the camera system away from a peripheral light source. It will be appreciated that camera exposures may be inadvertently increased by movement of the UAV while traveling to the destination. For example, the UAV may turn slightly toward a peripheral light source such as the sun which may cause a sharp increase an amount of stray light (e.g. non-image forming light) that reaches a camera's sensor. The systems and methods described herein may be implemented to alleviate this issue among others.

In various embodiments, a UAV may include a propulsion system to propel the UAV to a destination and a stereo camera unit to record imagery of the route from at least two perspectives to cause a disparity between images, e.g. a difference between where an object is located in a first image as compared to a second image. The UAV may be configured to use the stereo camera unit to track obstacles so that they can be avoided during flight. In some embodiments, the UAV is also configured to monitor exposure levels associated with cameras of the stereo camera unit to identify and reduce or eliminate lens flaring. Lens flaring may be identified based on an increase in exposure levels above those in which imagery contains data of sufficient quality that an obstacle and boundaries thereof can be reliably identified. For example, lens flaring may result in an object being completely whited out such that very little or no contrast exists where an object would otherwise show up in an image.

In response to lens flaring, the UAV may position components of the stereo camera unit with respect to a peripheral light source that is causing the lens flare. In some embodiments, the stereo camera unit may be fixed with respect to a forward facing direction of the UAV (e.g. a UAV heading) and lens flaring may be reduced by offsetting the UAV heading with respect to the course, e.g. by turning the camera away from a light source. In some embodiments, the stereo camera unit may be rotatably coupled to the UAV so that the camera can be reoriented with respect to a peripheral light source without altering the UAV heading. In some embodiments, the UAV may also include a lens hood that can be moved to block stray light from entering the stereo camera unit.

Figure 2A:
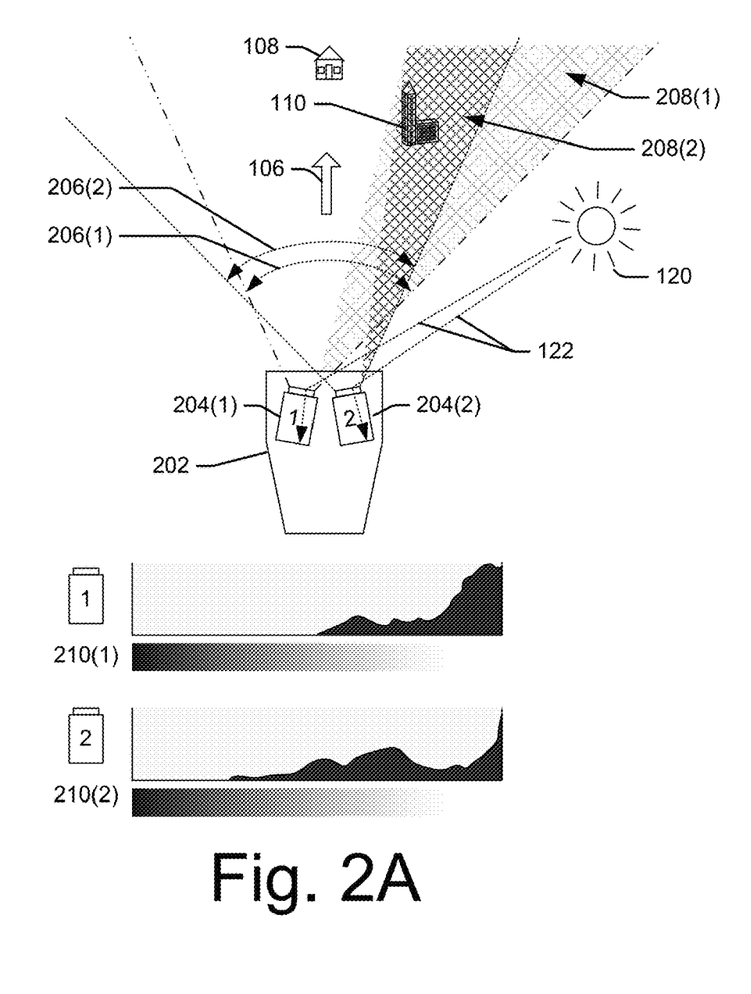
FIG. 2A is a schematic diagram of an illustrative stereo camera unit having two cameras with offset fields of view and a light source interfering with stereo vision capacities with respect to an obstacle.
Figure 2B:
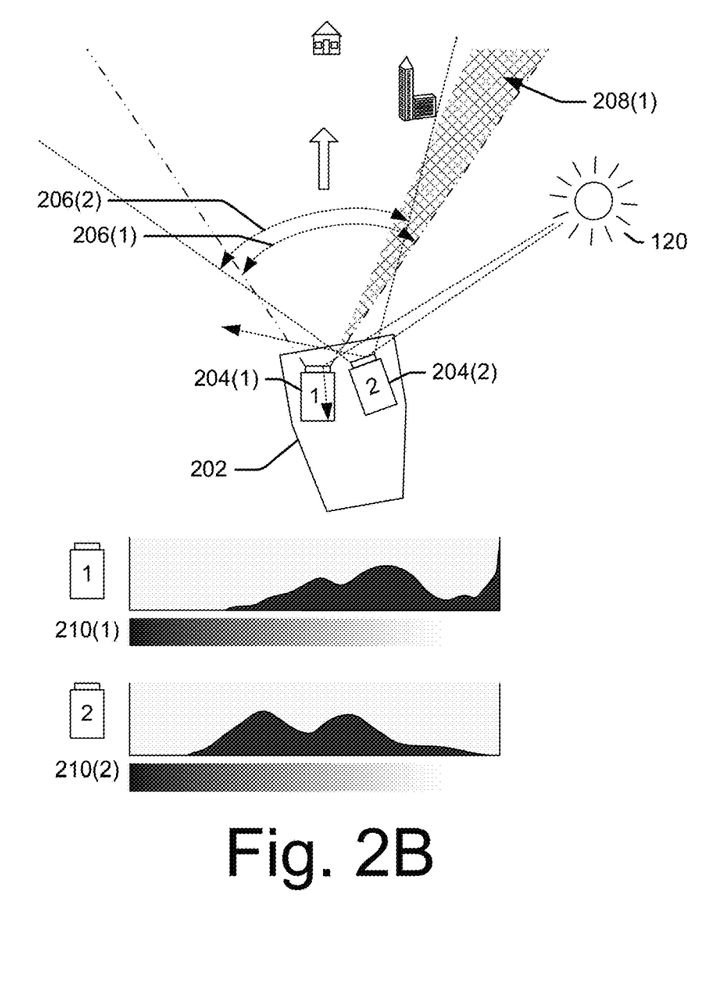
FIG. 2B is a schematic diagram of the stereo camera unit of FIG. 2A having been repositioned with respect to the light source to regain stereo vision capacities with respect to the obstacle.

In some embodiments, a location of a peripheral light source may be determined based on exposure data of imagery captured by the stereo camera unit. For example, the stereo camera unit may include two cameras with converging axis such that peripheral light will strike each cameras' outer lens at a different angle so that a severity of lens flaring may differ between the cameras. Thus, based on a determination of which camera is more severely flared it may also be determined where a light source is located with respect to the cameras' fields of view. For example, in a convergent camera configuration as shown in FIGS. 2A and 2B, the camera that is opposite the light source may experience greater flare.

In some embodiments, the stereo camera unit may include one or more camera housings which individual cameras may be configured to move within to control an amount of light entering the cameras lenses and/or a field of view of the cameras. For example, if a camera begins to be affected by lens flare then the camera may be retracted into the lens housing so that the lens housing blocks stray light from the camera. In some instances, retracting a camera into the housing may restrict or block a portion of the camera's field of view. Accordingly, once the occurrence of lens flare has subsided the camera may be moved back out to again protrude from or become flush with a face of the lens housing.

The techniques, apparatuses, and systems described herein may be implemented in a number of ways. Example implementations are provided below with reference to the following figures.

Figure 1:
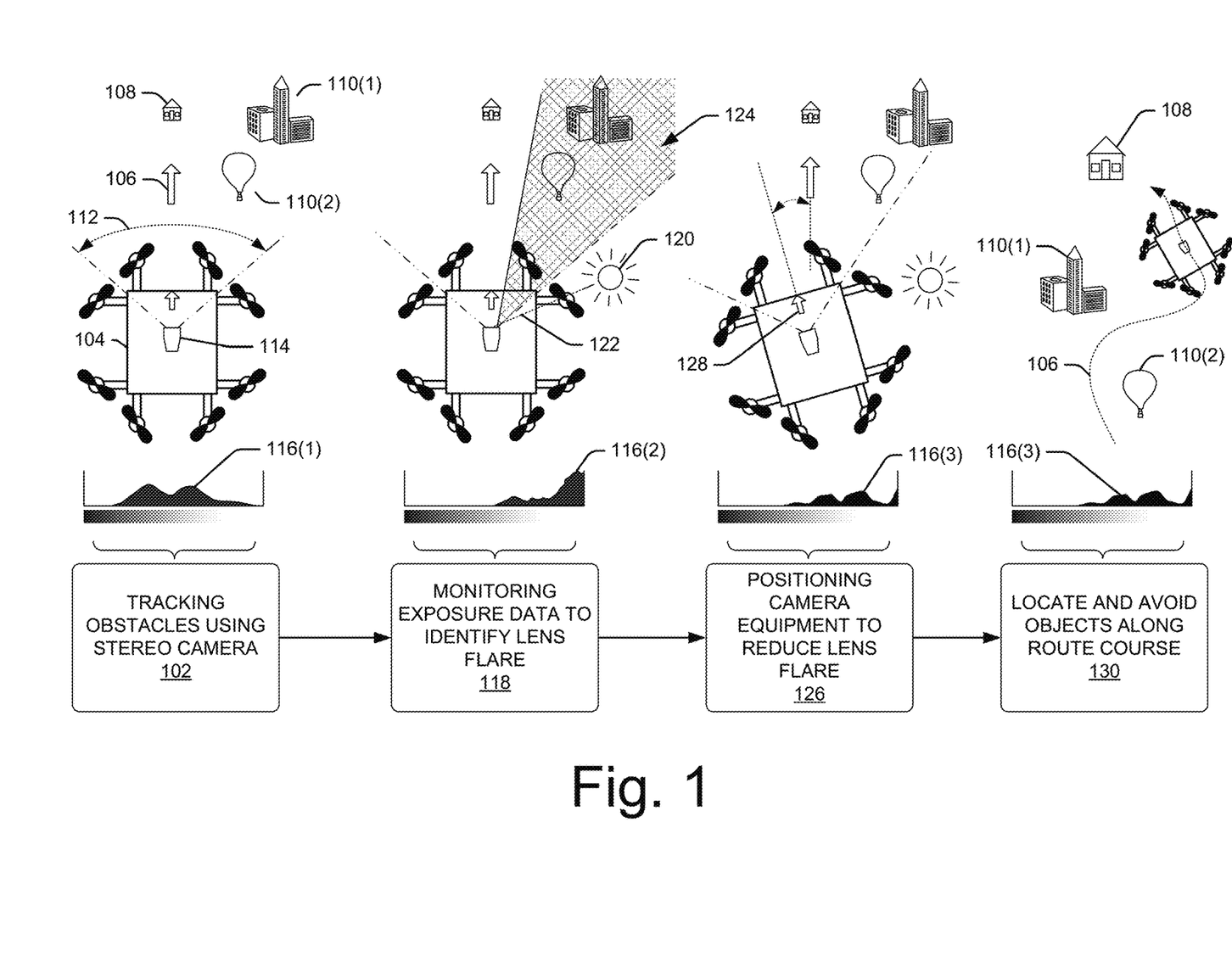
FIG. 1 is a pictorial flow diagram that shows an illustrative process of identifying and eliminating lens flare that interferes with an unmanned aerial vehicles (UAVs) ability to sense and avoid objects while traveling to a destination.

FIG. 1 is a pictorial flow diagram that shows an illustrative process of identifying and eliminating lens flare that interferes with an automated aerial vehicles (UAVs) 104 ability to sense and avoid objects 110 while travelling to a destination 108. The order of the blocks below is not limiting, and thus the operations associated with the blocks below may be performed in a different order and/or some operations may be performed in parallel with other operations.

At block 102, a UAV 104 may be traveling along a course 106 in route to a destination 108 and may be tracking one or more obstacles 110 that are within a field of view (FOV) 112 of a stereo camera unit 114 mounted on the UAV 104. In some embodiments, the FOV of view of the stereo camera unit is an overlapping region of at least two FOVs from at least two cameras, e.g. the region in which stereo vision may be usable within. The stereo camera unit 114 may include two or more cameras providing imagery of the obstacles 110 and/or the destination 108 from different perspectives to cause image disparity used for tracking. At 102, exposure levels 116(1) of the imagery may be substantially within the medium exposure ranges with sufficient contrast to identify disparity between images for particular objects. The UAV 104 may then autonomously update its course 106 to avoid collisions with the obstacles 110 and to safely arrive at the destination 108.

At block 118, while monitoring exposure level data 116 associated with the imagery the UAV 104 may identify an increase in the exposure to those shown as exposure levels 116(2). This increase may result from a light source 120 emitting light 122 into the stereo camera unit 114. Thus, at block 118 the exposure levels 116(2) may have spiked toward the high exposure ranges with a large amount of overexposed pixels from which meaningful data cannot be extracted for object tracking purposes, e.g. these regions may lack contrast needed to identify an object. As illustrated in FIG. 1, the light source 120 may be outside of the FOV of the stereo camera unit 114 such that the light 122 is non-image forming peripheral light entering the one or more cameras of the stereo camera unit 114 and causing lens flare that overexposes imagery corresponding to a portion of the FOV 112. This portion 124 is shown with shading to indicate that the light 122 is interfering with the obstacle tracking such that obstacles 110(1) and 110(2) are cannot be actively tracked. In some embodiments, in response to the light 122 interfering with an ability of the UAV to track an obstacle, e.g. due to an increase in exposure levels, the UAV may reduce its velocity and/or stop moving altogether. For example, if a UAV is travelling in route to the destination and is tracking a hot air balloon 110(2), the UAV may stop moving if the tracking the hot air balloon is interrupted 110(2).

At block 126, the UAV 104 changes a position and/or an orientation of at least some camera componentry associated with the stereo camera unit 114 with respect to the light source 120 in order to reduce or eliminate the occurrence lens flaring. For example, per the illustration the UAV 104 may be a rotorcraft type vehicle with the capability of altering a heading 128 of the UAV 104 without deviating from the course 106. As used herein, the term heading refers to a direction that a vehicle is facing such as, for example, a forward facing direction. The UAV 104 may reorient the stereo camera unit 114 away from the light source 120 far enough to adequately reduce or eliminate lens flaring while keeping the obstacles 110(1) and 110(2) within the FOV 112 to maintain tracking ability for these obstacles. In some embodiments, the UAV 104 may change a position and/or orientation of the camera componentry without changing the heading 128. For example, the stereo camera unit 114 may be rotated with respect to the heading 128, a camera hood may be deployed to block the light from the reaching the stereo camera unit 114, or the stereo camera unit 114 or individual cameras thereof may be retracted into a lens housing. Thus, the systems and methods described herein are applicable to a variety of vehicle types including rotorcraft capable of readily changing a heading without deviating from a course or route and also vehicles without this capability such as some fixed wing aircraft and passenger cars. At 126, exposure levels 116(3) of the imagery may be substantially returned to the medium exposure ranges with sufficient contrast to resume the ability to identify disparity for particular objects.

At block 130, the UAV 104 may then autonomously locate objects within the FOV 112 and avoid those objects while traveling to the destination 108. In particular, the UAV 104 may alter its course 106 to avoid collisions with both stationary objects such as the building 110(1) and also moving objects such as the hot air balloon 110(2).

FIG. 2A is a schematic diagram of an illustrative stereo camera unit 202 that includes a first camera 204(1) having a first FOV 206(1) and a second camera 204(2) having a second FOV 206(2). In some embodiments, the first FOV 206(1) and the second FOV 206(2) are offset and have angularly converging axis (e.g. through a middle of each camera's respective FOV) to cause image disparity. The light source 120 may be peripheral to the FOVs and may be emitting light 122 that enters each of the first camera 204(1) and the second camera 204(2). For example, the light 122 may create lens flare by entering a camera's outer lens and then propagating toward and hitting the camera's digital sensor (e.g. as illustrated the light is hitting the back of each camera).

The ultimate results of lens flare at the digital sensor may depend greatly on lens array geometry for any particular camera. Exemplary forms of lens flare include one or more polygonal shaped bright spots in an image, bright streaks across an image, or an overall washed out look (sometimes referred to as veiling flare). In the illustration, the light 122 is causing lens flaring that is overexposing a first region 208(1) of the first FOV 206(1) and a second region 208(2) of the second FOV 206(2). Respective exposure levels for the first FOV 206(1) and the second FOV 206(2) are represented in histogram form in histograms 210(1) and 210(2). Within FIG. 2A, histogram 210(1) conveys exposure data for the first FOV 206(1) and histogram 210(2) conveys exposure data for the second FOV 206(2). Although the exposure data for the first FOV 206(1) indicates higher exposure than that of the second FOV 206(2), both are toward the higher end of the exposure ranges and, therefore, image contrast is insufficient for stereo vision purposes, i.e. the obstacles 110 cannot be identified with one or both of the cameras' imagery. Thus, in FIG. 2A stereo vision capabilities of a vehicle using the stereo camera unit 202 may be impaired at least with respect to the obstacle such the vehicle may be unable to sense the obstacles 110 and update it route 106 to avoid them.

FIG. 2B is a schematic diagram of the stereo camera unit 202 of FIG. 2A having been repositioned with respect to the light source 120 to regain stereo vision capabilities with respect to the obstacles 110. In particular, the stereo camera unit 202 has been rotated counterclockwise away from the light source 120 to reduce the occurrence of lens flaring. FIG. 2B illustrates that the second camera 204(2) has been rotated away from the light source 120 enough that the light 122 no longer reaches the camera's sensor while the first camera 204(1) has been rotated away enough that a lesser amount of the light 122 reaches the sensor. Thus, the shaded region 208(1) is smaller in FIG. 2B than FIG. 2A and shaded region 208(2) is no longer present. Moreover, histograms 210(1) and 210(2) illustrate that the respective exposures for the first FOV 206(1) and the second FOV 206(2) have moved from the higher ranges of exposure to the middle ranges of exposure which results in better contrast qualities in the imagery. As illustrated in FIG. 2B, there remains a portion of the first FOV 206(1) that is overexposed and, therefore, stereo vision capabilities for this portion 208(1) may remain impaired since stereo vision capabilities may be dependent on having at least two quality images corresponding to any particular obstacle. However, since each camera can produce quality imagery of the obstacle 110 it can be sensed and avoided by a vehicle utilizing the stereo camera unit 204.

Figure 3A:
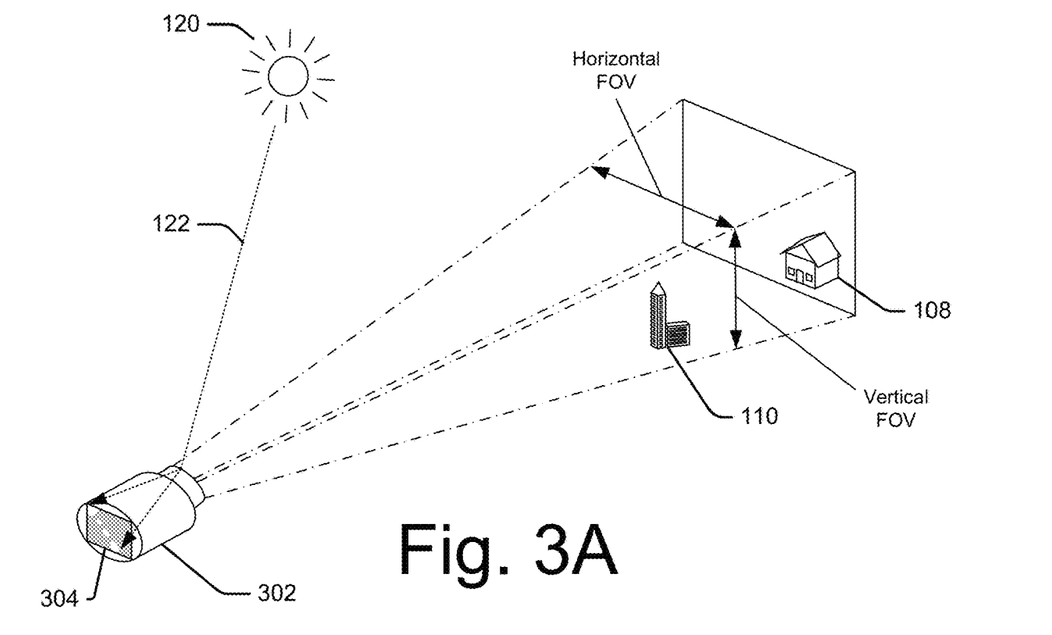
FIG. 3A is a schematic diagram of a peripheral light source that is outside a camera's field of view (FOV) and emitting light that is entering the camera's lens and striking the camera's sensor.
Figure 3B:
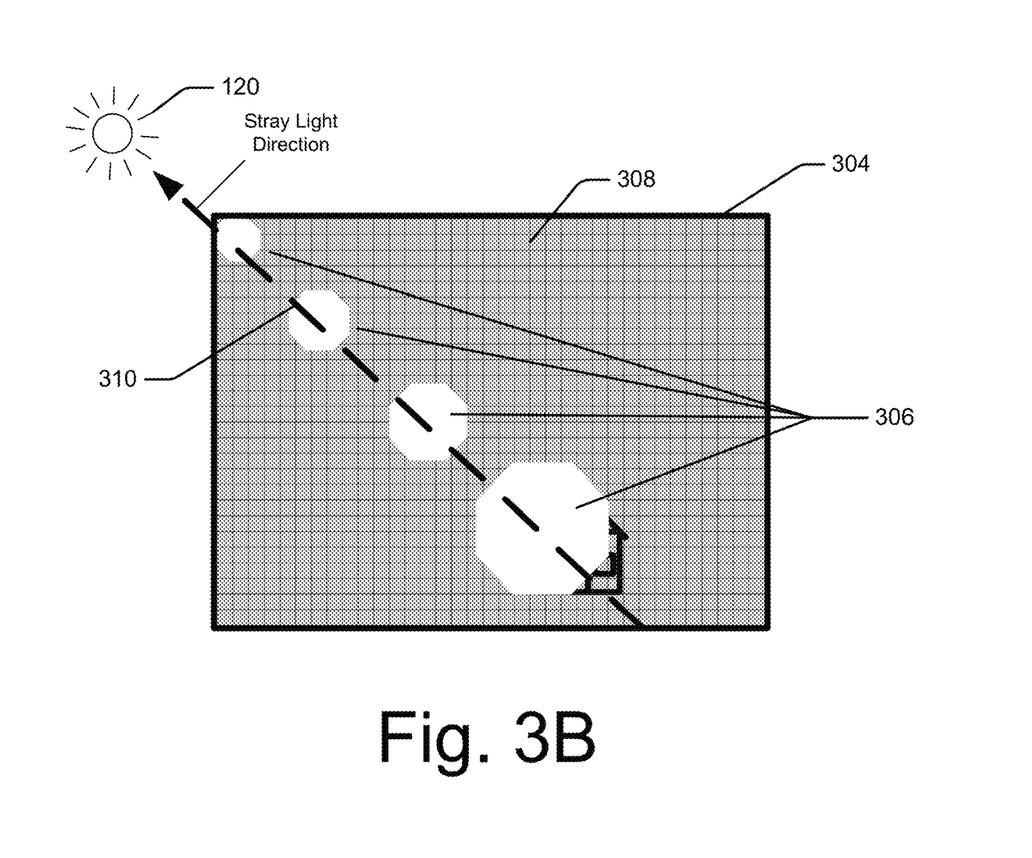
FIG. 3B is a schematic diagram of a lens flare pattern from which a location of the peripheral light source may be determined.

FIG. 3A is a schematic diagram of a peripheral light source 120 that is outside a field of view (FOV) of a camera 302 and that is emitting light 122 toward the camera 302. The light 122 is entering the camera's lens and striking a sensor 304 at the back of the camera 302. FIG. 3B is a schematic diagram of a lens flare pattern 306 from which a location of the peripheral light source 120 may be determined. In particular, the sensor 304 may include an array of photosites 308 that generates data indicating light intensity and color for the pixels of a digital image. In FIG. 3B, the individual photosites are represented as squares and are not shown to scale. For example, while the sensor 304 is illustrated as having 35 columns and 26 rows of photosites in the array 308, modern camera sensors include several thousand times as many photosites as illustrated in array 308. Based on known optical properties of the camera's lenses, the lens flare pattern 306 may be analyzed to determine a direction 310 from which the stray light is entering the camera 302. For example, it may be known for a particular camera that lens flare occurring in the form of several polygonal shaped regions of overexposed photosites is indicative of a light source being at an end of a line passing through each polygonal region. It may further be known that the polygonal shaped regions increase in size as they become farther from the light source. Therefore, the direction 310 from which the stray light is entering the camera 302 may be determined. Once determined, this information may be used to determine how to mitigate the occurrence of the lens flare 306. For example, a vehicle may rotate the camera 302 away from the light source 120 and/or a lens hood or visor may be deployed to block the light from entering the camera 302.

Although the lens flare is illustrated as a series of polygons, any other lens flare pattern may be analyzed to determine the location of the light source with relation to the camera. For example, lens flare in the form of a bright streak across an image with decreasing intensity may indicate that the light source is located just peripheral to the camera's FOV at the brighter end of the lens flare streak.

Figure 4A:
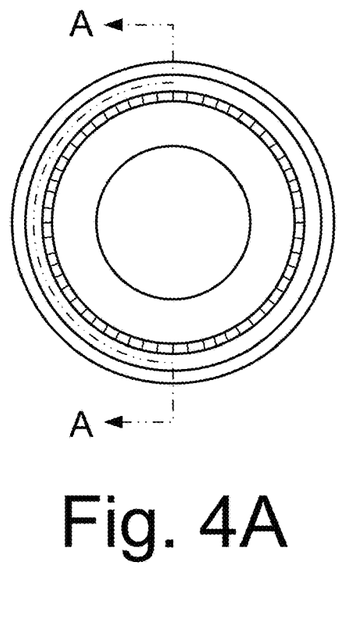
FIGS. 4A and 4B are a front view and a side view of a lens hood that is configured to move linearly with respect to a camera nested within the lens hood.
Figure 4B:
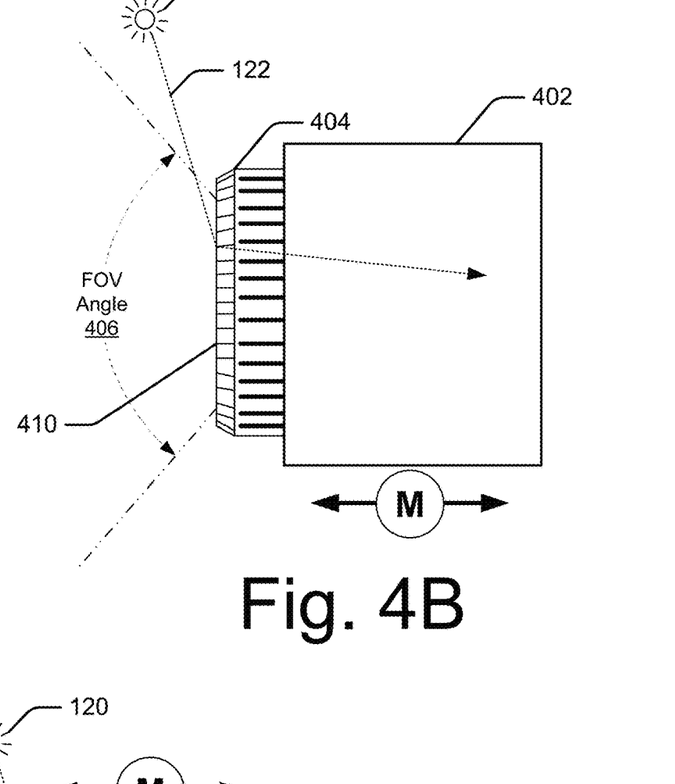
Figure 4C:
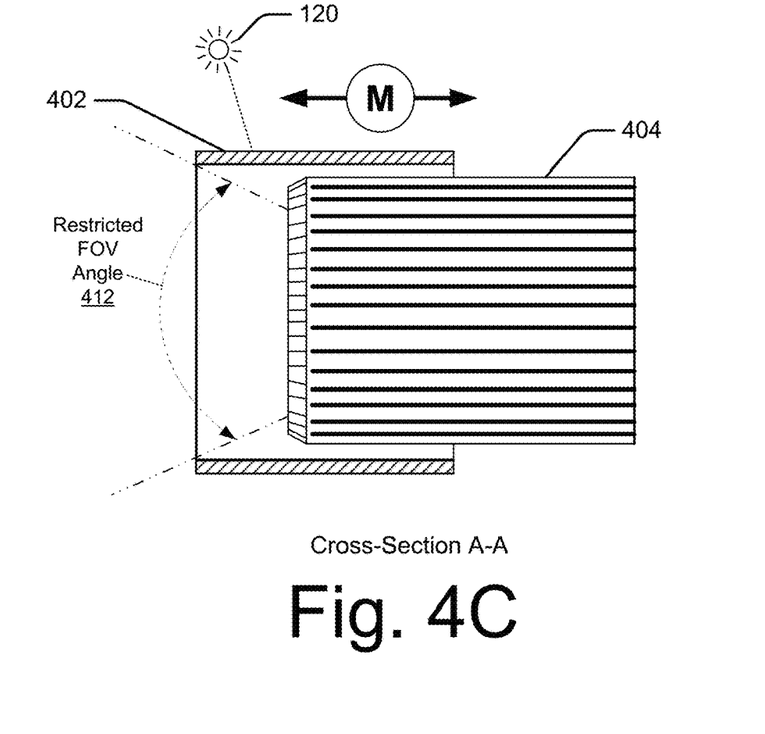
FIG. 4C is a side sectional view of the lens hood in an extended position.

FIGS. 4A and 4B are a front view and a side view of a lens hood 402 that is configured move linearly with respect to a camera 404 that is nested within the lens hood 402. The camera 404 has a FOV angle 406 that represents the angular range within which the camera may receive image forming light and a motor 408 that is configured to linearly actuate the lens hood 402 with respect to the camera's lens 410. Therefore, is response to peripheral light 122 from a light source 120 that is outside of the FOV angle 406 striking the lens 410 and causing lens flare in the resulting imagery, the motor 408 may cause the lens hood 402 to extend past the lens 410 to block the light 122 from reaching the lens 410. For example, FIG. 4C is a side sectional view of the lens hood 402 in an extended position to block the peripheral light 122. As illustrated in FIG. 4C, extending the lens hood 402 past the lens 410 at the face of the camera may cause a restricted FOV angle 412 which varies depending on how far the hood 402 is actuated past the camera face. In some embodiments, exposure levels are continually monitored while the position of the lens hood 402 is being changed so that the lens hood 402 is extended only so far as necessary to eliminate the flaring.

Figure 5A:
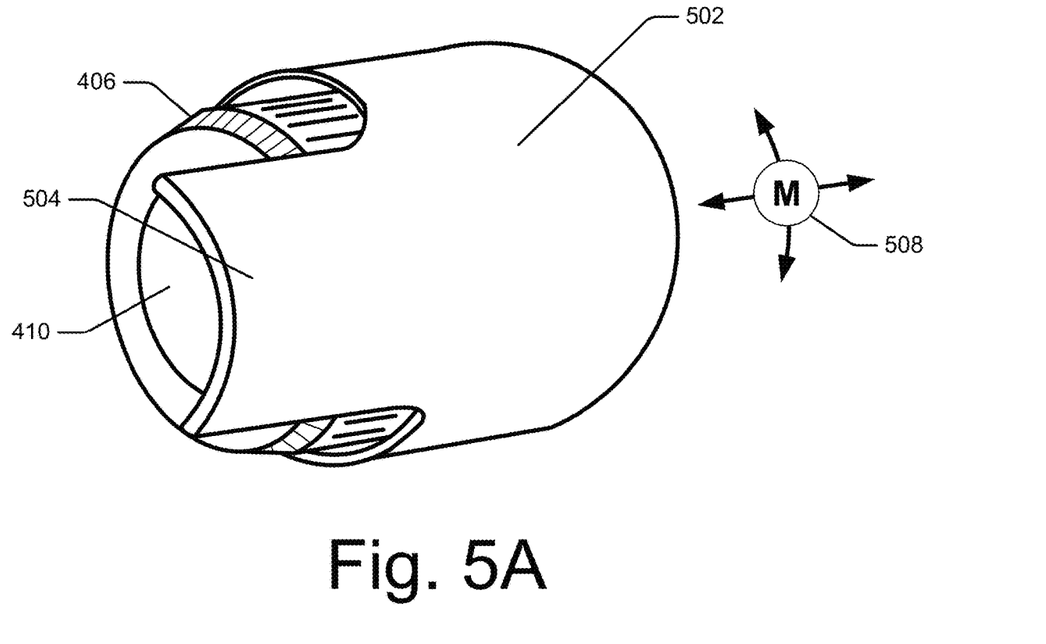
FIG. 5A is an isometric perspective view of a lens hood with a visor protruding out farther than the rest of the lens hood and a camera nested within the lens hood.
Figure 5B:
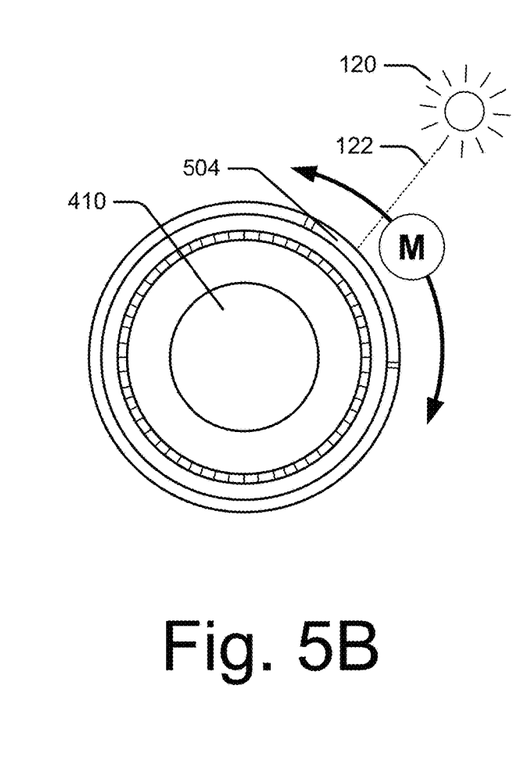
FIG. 5B is a front view thereof and FIG. 5C is a side view thereof.
Figure 5C:
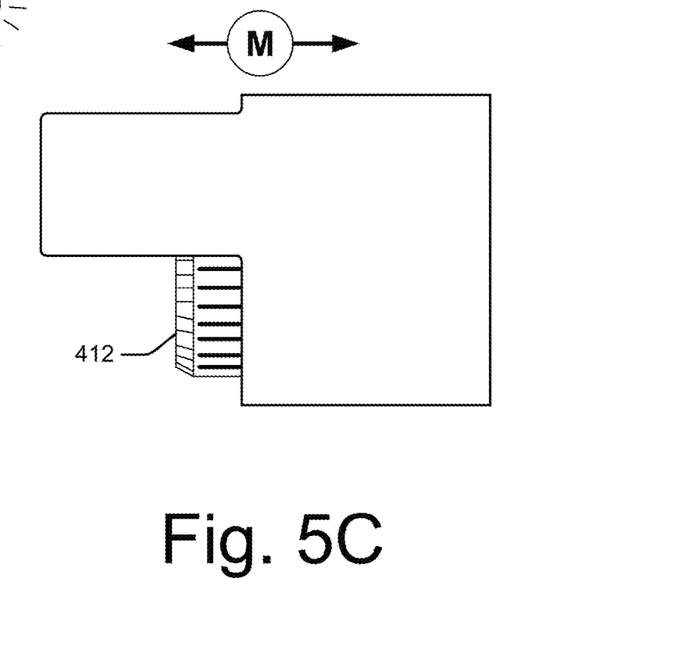

FIG. 5A is an isometric perspective view of a lens hood 502 with a visor 504 protruding out farther than the rest of the lens hood 502. Nested within the lens hood 502 is a camera 404. In some embodiments, the lens hood 502 is coupled to a motor 508 that is configured to move the lens hood 502 with respect to the camera 404 in order to block peripheral light from striking the camera's lens 410. For example, with reference to FIG. 4B the light source 120 may be emitting light 122 toward the lens 410 which may cause lens flaring and, in response to the lens flaring the motor may be caused to rotate the lens hood 502 until the visor 504 blocks the light 122 from reaching the lens 410. Therefore, in situations in which the stray light causing lens flare is coming substantially from a point source, e.g. the sun, then the visor 504 may simply be rotated into a position to block the light. In some embodiments, the lens hood 502 may also be configured to be linearly actuated so that at any given time the camera's FOV is maximized. For example, in a situation where the sun is overhead and there are no other significant sources of peripheral light, the lens hood 502 may be retracted so that only the visor 504 portion protrudes out past the face 412 of the camera. Thus, only the visor 504 has the potential to block any portion of the camera's FOV. In contrast, in a situation where there are other sources of peripheral light causing lens flare, e.g. the sun being reflected off buildings or water, then the lens hood 502 may be positioned to extend beyond the face 412 of the camera and doing so may restrict the camera's FOV.

Figure 6A:
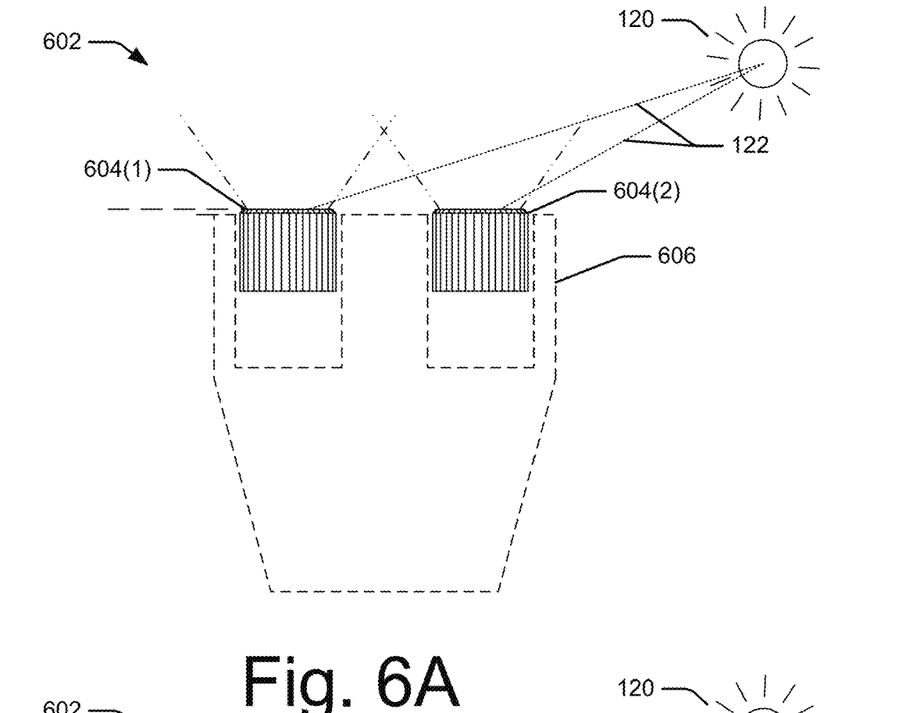
FIGS. 6A and 6B illustrate a stereo camera unit having two cameras that are retractable into a camera housing for blocking peripheral light from reaching the cameras' lenses.
Figure 6B:
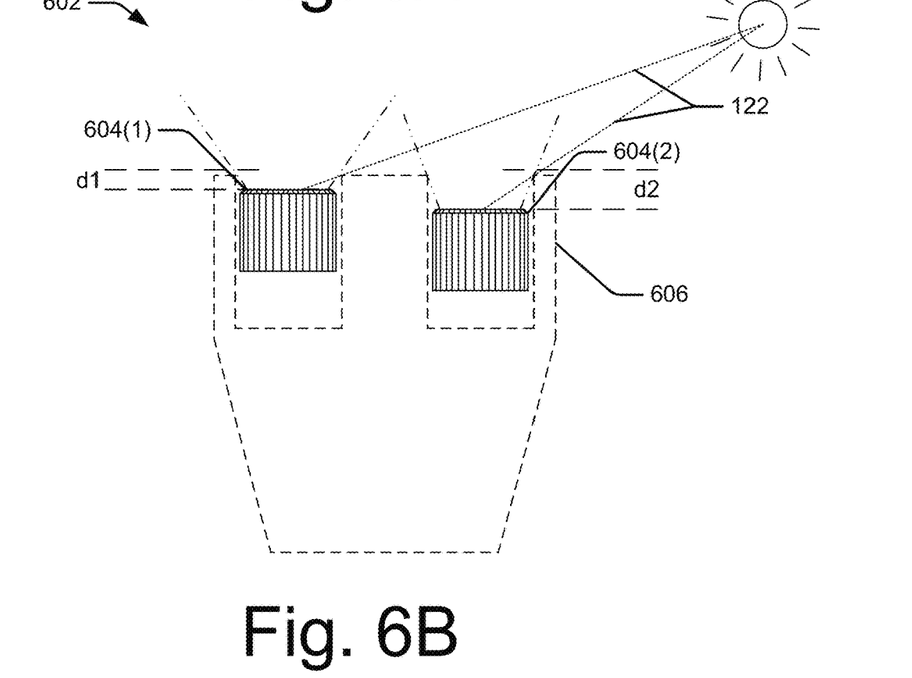

FIGS. 6A and 6B illustrate a stereo camera unit 602 having two cameras 604(1) and 604(2) that are retractable into a camera housing 606 for blocking peripheral light 122 from entering reaching the cameras' lenses. With particular reference to FIG. 6A, each of the cameras may be positioned to be flush with or slightly protrude from the camera housing 606 so that the respective FOVs (outlined with dashed lines) of the cameras are not restricted by the camera housing 606. As shown in FIG. 6A a light source 120 is emitting light 122 that is striking the cameras and, therefore, potentially causing lens flare. In FIG. 6B, each of the cameras has been retracted into the camera housing 606 far enough that the light 122 is blocked from reaching the camera lenses by the housing 606. In some embodiments, the cameras are configured to move precisely the same amount as one another. For example, if camera 604(2) has to be retracted a particular distance d2 into the camera housing 606 in order for the light 122 to be blocked then camera 604(1) will also move the same distance d2 into the housing. In other embodiments, the cameras are configured to move independently from each other such that if camera 604(2) has to be retracted a relatively long distance d2 into the housing for the light 122 to be effectively blocked whereas camera 604(1) only has to be retraced a shorter distance d1, the camera 604(1) will be retracted d1 into the housing 606 and the camera 604(2) will be retracted d2 into the camera housing 606 as illustrated in FIG. 6B. Thus, as shown in FIG. 6B the respective FOVs of each camera are restricted by different amounts that correspond to how far they each were retracted into the camera housing 606.

With particular reference to FIGS. 2A-B and FIGS. 6A-B, the cameras of a stereo camera unit may be configured to with converging fields of view such that the cameras' respective directions converge as shown in FIGS. 2A-B or the cameras may be configured to be parallel or substantially parallel with one another as shown in FIGS. 6A-B. Furthermore, in some embodiments the cameras may be configured with diverging fields of view or any other geometrical configuration adequate for stereo vision purposes whether now known or subsequently developed.

Figure 7:
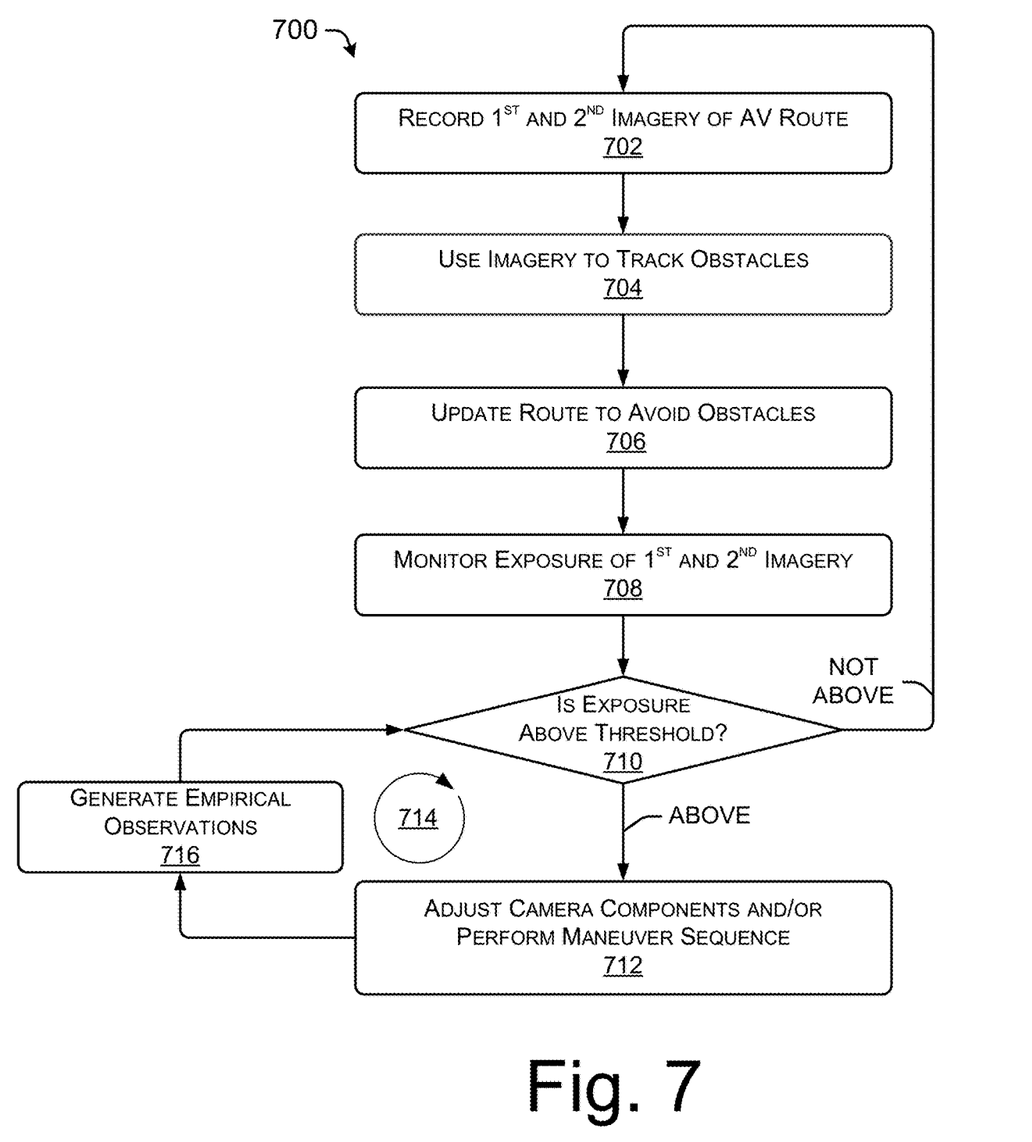
FIG. 7 is a flow diagram of an example process for flare detection and avoidance is a stereo vision system of an autonomous vehicle, in accordance with embodiments of the disclosure.

FIG. 7 is a flow diagram of an example process for flare detection and avoidance is a stereo vision system of a vehicle, in accordance with embodiments of the disclosure. In some embodiments, the process 700 may be performed by the UAV control system 800. Some of the operations in the process 700 may be performed in parallel or possibly in a different order than the order shown in FIG. 7. In some embodiments, the operations in FIG. 7 may be performed to control one or more physical components described in relation to FIGS. 2A-B, 3A-B, 4A-C, 5A-C, and/or 6A-B.

At 702, a stereo camera unit may be record first imagery and second imagery of a vehicle route such as a UAV flight path or a roadway on which a car or truck is travelling. In some embodiments, each of the stereo camera unit and a propulsion system may be mounted to a frame of the vehicle. For example, a UAV may have a frame that each of the stereo camera unit and one or more propellers and motors are attached to. Alternatively, a vehicle may have a frame that steerable tires are mounted to along with a stereo camera unit. The first imagery and the second imagery may each include a plurality of image frames that are captured sequentially at a framerate. Also, a first camera and second camera may be synchronized so that frames in the first imagery correspond to simultaneously taken frames in the second imagery.

At 704, the first imagery and second imagery may be used to track obstacles while the vehicle travels along a route to a destination. For example, an obstacle may be captured within a frame of the first imagery at a first location and the same obstacle may be captured within a corresponding frame of the second imagery at a second location. Therefore, the first and second locations may be identified through image analysis to determine a disparity across the images from which the obstacle location with respect to the vehicle can be determined.

At 706, a route of the vehicle may be updated to avoid any identified obstacles. For example, a building 110(1) or a hot air balloon 110(2) may be located and tracked based on the disparity between frames of the first imagery and second imagery. The vehicle may then continually monitor the respective locations of the building 110(1) and/or hot air balloon 110(2) and calculate an updated route to the destination that maintains a safe distance from each obstacle. In some embodiments, the vehicle may recognize whether an obstacle is stationary or mobile and maintain a relatively larger distance between mobile obstacles than stationary obstacles.

At 708, exposure levels for each of the first imagery and the second imagery may be monitored. In some embodiments, the exposure levels for photosites of a sensor may be monitored in aggregate form. For example, the vehicle may analyze histogram type data that indicates a number of photosites that correspond to each of a plurality of exposure levels but which does not indicate specifically which photosites of the sensor's array correspond to each exposure level. Illustrative histograms are shown in FIGS. 2A and 2B. With particular reference to FIG. 2A, while it can be determined from the histograms associated with the first camera 204(1) and second camera 204(2) that a relatively larger number of photosites are overexposed in the first imagery than in the second imagery. However, spatial exposure information such as where on the sensor photosites are being overexposed cannot be gleaned from the exposure data in histogram form. In some embodiments, the exposure levels may be monitored on a finer level than in the aggregate so that at least some spatial information can be determined regarding exposure levels for specific photosites. For example, with reference to FIGS. 3A and 3B, specific lens flare patterns may be determined as received by the cameras' sensors.

At 710, it may be determined whether the exposure levels are above an exposure threshold. For example, if one or more portions of the first imagery or the second imagery are being overexposed such that objects within a camera's FOV at those locations cannot be identified, then it may be that the exposure is above the exposure threshold. In some embodiments, the exposure threshold may include an allowable size and/or location of overexposed regions so that small regions of lens flare around an image perimeter do not trigger corrective action. For example, if less than 15% of a FOV is overexposed and the overexposure is near the perimeter of the FOV then corrective action may not be necessary. In contrast, if a central portion of the FOV is overexposed this may posed a relatively greater hazard and, therefore, may trigger corrective action.

If the exposure levels are not above the threshold, then the process may proceed to block 702 to capture new quality imagery, e.g. imagery that is within acceptable exposure ranges, and continue to track obstacles and avoid the obstacles while monitoring exposure levels.

If the exposure levels are above the threshold, then the process may proceed to block 712 at which one or more camera components may be adjusted and/or the vehicle may be caused to perform a sequence of maneuvers. For example, in some embodiments, a stereo camera unit may be rotated with respect to a heading of the vehicle to change an angle at which peripheral light is striking the camera. Moreover, in some embodiments, the vehicle may be caused to alter its heading with respect to its course and/or deploy a lens hood or visor thereof to block peripheral light from striking the camera.

Following or during the performance of operations at 712, the process may enter an empirical observation loop 714 during which exposure levels are continually monitored with respect to different maneuvers and/or componentry positions associated with block 712. For example, at block 712 a stereo camera unit of the vehicle may be rotated one degree with respect to a peripheral light source, e.g. by rotating the camera with respect to the vehicle heading or by rotating the entire vehicle including the stereo camera. Then, after the one degree rotation, the process may proceed to 716 at which one or more empirical observations are recorded. In some embodiments, empirical observations are recorded by capturing imagery as is done in block 702 and then quickly determining exposure data as is done at block 706. The exposure data may be stored as empirical observation data that corresponds to a particular configuration camera components and/or an orientation of the vehicle. For example, an empirical observation may be that after the one degree of rotation the exposure levels decreased to a slightly lesser exposure.

Then, at block 710 it may be determined that after the one degree rotation, despite the decrease in exposure, the exposure levels remain above the threshold causing the process to proceed again to 712 at which the stereo camera unit may be rotated again, e.g. another one degree. Moreover, in some implementations, if the exposure increased due to the original one degree rotation then the stereo camera unit may be rotated in the opposite direction. Following the second rotation of the stereo camera unit, one or more new empirical observations may be recorded at 702 after which the process may proceed again to 710. This empirical observation loop 714 will then continue until an n-th rotation after which the exposure levels are no longer above the exposure threshold. Then, once the exposure levels have fallen below the threshold at 710, the process may proceed to block 702 at which the process iteratively continues.

Although FIG. 7, is discussed in relation to a UAV rotating a heading with respect to a light source, numerous other types of maneuvers can be performed by the UAV in order to change an orientation of one or more cameras with respect to the peripheral light source. For example, in some instances the UAV may alter its orientation through rotations about one or more of the pitch axis, roll axis, and/or yaw axis corresponding to a particular aircraft configuration. Thus, in a situation in which the peripheral light source is overhead of the UAV, the UAV may pitch its nose down to rotate the camera away from the light source.

Figure 8:
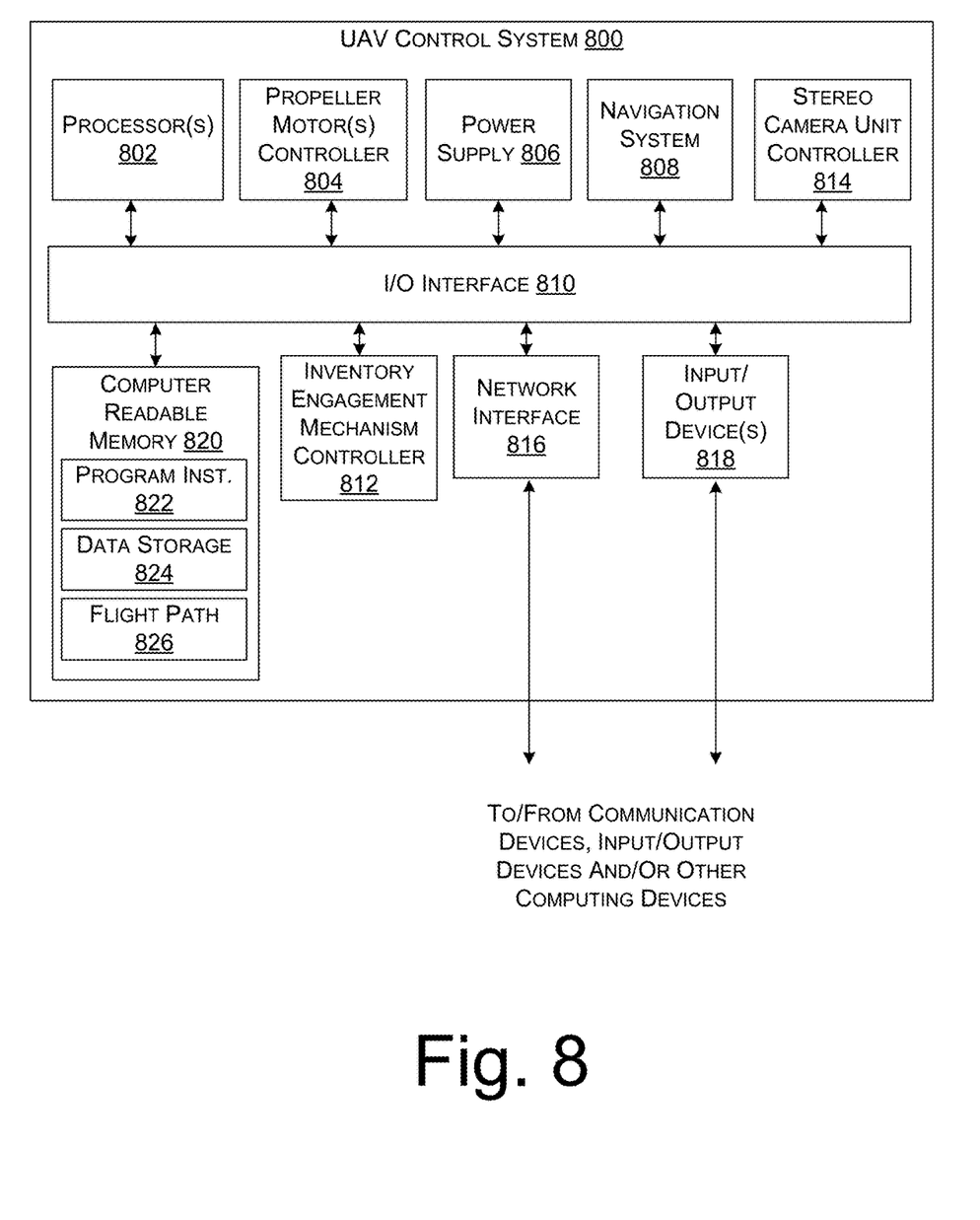
FIG. 8 is a block diagram of an illustrative control system of a UAV.

FIG. 8 is a block diagram of an illustrative control system 800 of a UAV. In various examples, the block diagram may be illustrative of one or more aspects of the UAV control system 800 that may be used to implement the various systems, devices, and techniques discussed herein. In the illustrated implementation, the UAV control system 800 includes one or more processors 802, coupled to a non-transitory computer readable storage medium 820 via an input/output (I/O) interface 810. The UAV control system 800 may also include a propeller motor controller 804, power supply module 806 and/or a navigation system 808. The UAV control system 800 may further include an inventory engagement mechanism controller 812, a stereo camera unit controller 814, a network interface 816, and one or more input/output devices 818.

In various implementations, the UAV control system 800 may be a uniprocessor system including one processor 802, or a multiprocessor system including several processors 802 (e.g., two, four, eight, or another suitable number). The processor(s) 802 may be any suitable processor capable of executing instructions. For example, in various implementations, the processor(s) 802 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 802 may commonly, but not necessarily, implement the same ISA.

The non-transitory computer readable storage medium 820 may be configured to store executable instructions, data, flight paths, and/or data items accessible by the processor(s) 802. In various implementations, the non-transitory computer readable storage medium 820 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 820 as program instructions 822, data storage 824 and flight path data 826, respectively. In other implementations, program instructions, data and/or flight paths may be received, sent or stored upon different types of computer-accessible media, such as non-transitory media, or on similar media separate from the non-transitory computer readable storage medium 820 or the UAV control system 800. Generally speaking, a non-transitory, computer readable storage medium may include storage media or memory media such as flash memory (e.g., solid state memory), magnetic or optical media (e.g., disk) coupled to the UAV control system 800 via the I/O interface 810. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 816.

In one implementation, the I/O interface 810 may be configured to coordinate I/O traffic between the processor(s) 802, the non-transitory computer readable storage medium 820, and any peripheral devices, the network interface or other peripheral interfaces, such as input/output devices 818. In some implementations, the I/O interface 810 may perform any necessary protocol, timing or other data transformations to convert data signals from one component (e.g., non-transitory computer readable storage medium 820) into a format suitable for use by another component (e.g., processor(s) 802). In some implementations, the I/O interface 810 may include support for devices attached through various types of peripheral buses, such as a variant of the Peripheral Component Interconnect (PCI) bus standard or the Universal Serial Bus (USB) standard, for example. In some implementations, the function of the I/O interface 810 may be split into two or more separate components, such as a north bridge and a south bridge, for example. Also, in some implementations, some or all of the functionality of the I/O interface 810, such as an interface to the non-transitory computer readable storage medium 820, may be incorporated directly into the processor(s) 802.

The propeller motor(s) controller 804 communicates with the navigation system 808 and adjusts the power of each propeller motor to guide the UAV along a determined flight path which may be dynamically updated to avoid obstacles identified based on imagery captured by a stereo camera unit communicatively coupled to the stereo camera unit controller 814. The power supply module 806 may control the charging and any switching functions associated with one or more power modules (e.g., batteries) of the UAV.

The navigation system 808 may include a GPS or other similar system that can be used to navigate the UAV to and/or from a location. The inventory engagement mechanism controller 812 communicates with the actuator(s) or motor(s) (e.g., a servo motor) used to engage and/or disengage inventory. For example, when the UAV is positioned over a level surface at a delivery location, the inventory engagement mechanism controller 812 may provide an instruction to a motor that controls the inventory engagement mechanism to release the inventory. The inventory may be released from an external position or may be released from an internal cargo bay of the UAV.

The stereo camera unit controller 814 may operate to perform one or more operations discussed herein with relation to sensing and avoiding obstacles while travelling along a route to a destination. For example, the stereo camera unit controller 814 may record imagery of the route from two or more perspectives, e.g. using two or more different cameras, to sense and avoid obstacles along a route. The stereo camera unit controller 814 may also monitor and respond to increases in exposure levels, e.g. from peripheral light sources causing lens flare, to move camera componentry until the exposure levels are reduced back to levels at which obstacle tracking can be effectively performed. In particular, the stereo camera unit controller 814 may perform any operations and/or move any componentry discussed in relation to FIGS. 1-7.

The network interface 816 may be configured to allow data to be exchanged between the UAV control system 800, other devices attached to a network, such as other computer systems, and/or with UAV control systems of other UAVs. For example, the network interface 816 may enable wireless communication between numerous UAVs. In various implementations, the network interface 816 may support communication via wireless general data networks, such as a Wi-Fi network. For example, the network interface 816 may support communication via telecommunications networks such as cellular communication networks, satellite networks, and the like.

Input/output devices 818 may, in some implementations, include one or more displays, image capture devices, thermal sensors, infrared sensors, time of flight sensors, accelerometers, pressure sensors, weather sensors, airflow sensors, etc. Multiple input/output devices 818 may be present and controlled by the UAV control system 800. One or more of these sensors may be utilized to assist in landings as well as avoiding obstacles during flight.

As shown in FIG. 8, the memory may include program instructions 822 which may be configured to implement the example processes and/or sub-processes described above. The data storage 824 may include various data stores for maintaining data items that may be provided for sensing and avoiding obstacles, determining flight paths, retrieving inventory, landing, identifying a level surface for disengaging inventory, causing movement of ballast, etc.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 800 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV control system 800 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 800. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV control system 800 may be transmitted to the UAV control system 800 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations. Additionally, while the term Unmanned Aerial Vehicle (UAV) is used throughout this disclosure, a person having ordinary skill will appreciate that the embodiments disclosed herein may be applicable to land, sea, air, or space vehicles, whether those vehicles are "manned" or "unmanned. Additionally, vehicles described herein may be autonomously controlled, locally controlled, or remotely controlled without departing from the scope of the embodiments disclosed.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. An unmanned aerial vehicle (UAV), comprising:
a UAV frame configured to support components of the UAV;
a propulsion system coupled to the UAV frame, the propulsion system to generate thrust to propel the UAV along a route toward a destination;
a stereo camera unit coupled to the UAV frame, the stereo camera unit recording at least first imagery of the route with a first camera and second imagery of the route with a second camera, the first camera having a first field of view (FOV) and the second camera having a second FOV, wherein the first FOV and the second FOV are offset to cause a disparity between the first imagery and the second imagery;
one or more processors; and
memory coupled to the one or more processors, the memory including instructions that are executable by the one or more processors to perform operations comprising:
tracking one or more obstacles along a course to avoid the one or more obstacles, the tracking based on the disparity between the first imagery and the second imagery;
monitoring at least a first exposure level associated with the first imagery by monitoring a first histogram data and a second exposure level associated with the second imagery by monitoring a second histogram data;
identifying lens flare that is caused by a source of stray light and that interferes with the tracking of the one or more obstacles;
comparing the first histogram data to the second histogram data to determine an exposure difference between the first imagery and the second imagery;
determining a location of the source of the stray light based at least in part on the exposure difference; and
in response to at least one of the first exposure level or the second exposure level exceeding an exposure threshold, using the location of the source of stray light to position at least one component of the stereo camera unit to reduce the first exposure level as measured by the first histogram data or to reduce the second exposure level as measured by the second histogram data with respect to the source of the stray light to reduce the lens flare.

2. The UAV as recited in claim 1, the operations further comprising:
causing the UAV to perform a predetermined maneuver sequence to adjust an orientation of the stereo camera unit with respect to the source of the stray light; and
monitoring at least one of the first exposure data or the second exposure data to generate empirical lens flare observations during the predetermined maneuver sequence, and wherein positioning the at least one component of the stereo camera unit is based on the empirical lens flare observations.

3. The UAV as recited in claim 1, wherein the stereo camera unit is fixed with respect to a UAV heading, and wherein the operations further comprise, in response to at least one of the first exposure level or the second exposure level exceeding the exposure threshold, offsetting the UAV heading from the route.

4. The UAV as recited in claim 1, wherein positioning the at least one component of the stereo camera unit includes at least one of rotating a lens hood around a third FOV of the stereo camera unit or extending the lens hood along a linear path toward the third FOV of the stereo camera unit.

5. The UAV as recited in claim 1, wherein positioning the at least one component of the stereo camera unit includes rotating the stereo camera unit with respect to a UAV heading that corresponds to a forward facing direction of the UAV.

6. The UAV as recited in claim 1, the operations further comprising updating the course in response to using the location of the source of stray light to position at least one component of the stereo camera unit.

7. A method comprising:
propelling a vehicle along a route toward a destination;
recording at least first imagery of the route with a first camera and second imagery of the route with a second camera, the first camera having a first field of view (FOV) and the second camera having a second field of view, the first FOV being offset from the second FOV to cause a disparity between the first imagery and the second imagery;
scanning the route for obstacles to avoid the obstacles, the scanning based on the disparity between the first imagery and the second imagery;
monitoring at least one of a first exposure level associated with the first imagery by monitoring a first histogram data or a second exposure level associated with the second imagery by monitoring a second histogram data;
detecting a disruption to the scanning that is caused by at least one of the first exposure level or the second exposure level exceeding an exposure threshold; and
in response to a disruption to the scanning that is caused by the at least one of the first exposure level or the second exposure level exceeding the exposure threshold, repositioning at least one camera component to reduce the first exposure level as measured by the first histogram data or to reduce the second exposure level as measured by the second histogram data with respect to a light source to reduce an amount of light entering at least one of the first camera or the second camera.

8. The method of claim 7, wherein monitoring the at least one of the first exposure level associated with the first imagery or the second exposure level associated with the second imagery includes monitoring at least one of first histogram data corresponding to the first imagery or second histogram data corresponding to the second imagery.

9. The method of claim 7, wherein the at least one camera component comprises a lens hood, and wherein repositioning the at least one camera component includes at least one of rotating the lens hood around a third FOV of the stereo camera unit or extending the lens hood along a linear path toward the third FOV of the stereo camera unit.

10. The method of claim 9, wherein the lens hood includes a visor, and wherein rotating the lens hood around the third FOV includes rotating the visor to a position that is between an outer camera lens and the light source.

11. The method of claim 7, wherein repositioning the at least one camera component includes retracting at least one of the first camera or the second camera into at least one camera housing to cause the at least one camera housing to block the light from entering at least one of the first camera or the second camera.

12. The method of claim 7, wherein repositioning the at least one camera component includes at least one of:
retracting the first camera a first distance into at least one camera housing to cause the first exposure level to fall below the exposure threshold; or retracting the second camera a second distance into the at least one camera housing to cause the second exposure level to fall below the exposure threshold.

13. The method of claim 7, wherein repositioning the at least one camera component with respect to the light source comprises:
   rotating a heading of the vehicle away from the light source; and
   monitoring at least one of the first exposure level or the second exposure level to generate empirical lens flare observations at a plurality of different headings.

14. The method of claim 7, wherein repositioning the at least one camera component with respect to the light source comprises, offsetting at least one of the first camera or the second camera from a heading of the vehicle.

15. The method as recited in claim 7, further comprising updating the route in response to repositioning the at least one camera component.

16. An unmanned aerial vehicle (UAV) comprising:
   one or more processors; and
   memory coupled to the one or more processors, the memory including one or more computer-executable instructions that are executable by the one or more processors to perform operations comprising:
      identifying an obstacle along a route within each of a first field of view (FOV) of a first camera and a second FOV of a second camera, wherein the first FOV and the second FOV are offset;
      tracking the obstacle to avoid the obstacle, the tracking based on a disparity between a first location of the obstacle within the first FOV and a second location of the obstacle within the second FOV;
      monitoring a first exposure level associated with the first FOV and a second exposure level associated with the second FOV;
      detecting at least one of the first exposure level or the second exposure level exceeding an exposure threshold that interferes with tracking the obstacle; and
      in response to the at least one of the first exposure level or the second exposure level exceeding the exposure threshold, performing one or more aerial maneuvers to change an orientation of the UAV with respect to a peripheral light source to reduce the first exposure level as measured by a first histogram data or to reduce the second exposure level as measured by a second histogram data.

17. The UAV as recited in claim 15, wherein the one or more aerial maneuvers includes at least one of:
   a rotation of a UAV heading with respect to the peripheral light source, or
   a pitch of a UAV with respect to the peripheral light source.

18. The UAV as recited in claim 15, the operations further comprising:
   generating empirical observations at a plurality of increments of the one or more aerial maneuvers; and
   iterating through the plurality of increments of the one or more aerial maneuvers until the first exposure level and the second exposure level fall below the exposure threshold.

19. The UAV as recited in claim 15, the operations further comprising reducing a velocity of the UAV in response to the tracking the obstacle being interrupted due to at least one of the first exposure level or the second exposure level exceeding the exposure threshold.

20. The UAV as recited in claim 16, wherein the operation of in response to the at least one of the first exposure level or the second exposure level exceeding the exposure threshold further comprises maintaining the route when the first exposure level or the second exposure level exceeding the exposure threshold is at a first perimeter of the first FOV or a second perimeter of the second FOV.

* * * * *